Oct. 8, 1946.     J. BURNHAM     2,408,910
ELECTRICAL CONDENSER
Filed July 27, 1942
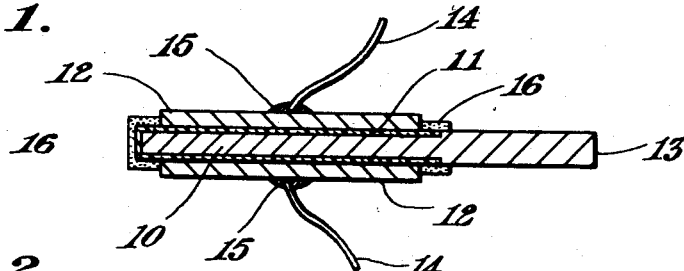
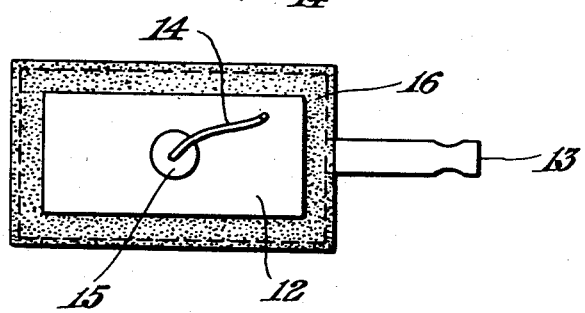
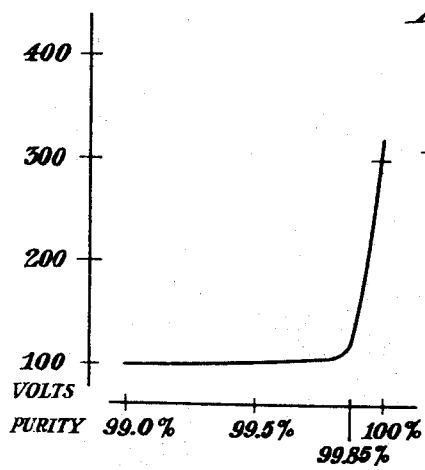
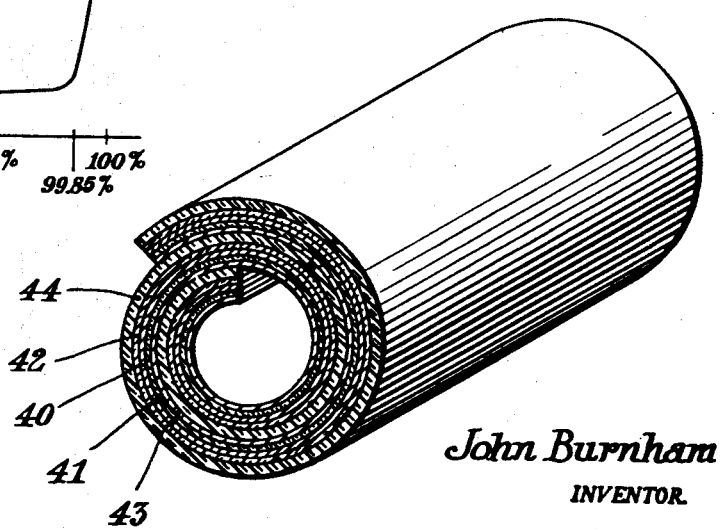
John Burnham
INVENTOR.
BY Vernon M. Dorsey
ATTORNEY Patented Oct. 8, 1946

2,408,910

UNITED STATES PATENT OFFICE 2,408,910

ELECTRICAL CONDENSER

John Burnham, North Adams, Mass., assignor to Sprague Electric Company, North Adams, Mass., a corporation of Massachusetts Application July 27, 1942, Serial No. 452,501

4 Claims. (Cl. 175—41)

The present invention relates to electrical condensers and to a process for their manufacture. More particularly, the invention relates to electrostatic condensers in which one of the electrodes consists of a filming metal, and the dielectric consists of a dry film electrolytically formed on the electrode.

Many attempts have been made to produce electrostatic condensers in which a filming metal base served as one of the electrodes and was provided with an electrolytically formed integral dry film serving as a dielectric. So far, however, condensers of this type have been of limited usefulness chiefly because of the deficiencies of the dielectric heretofore made.

As a result of an extended study of this problem, I have found that to obtain satisfactory electrostatic condensers of the above type, certain basic requirements must be met which are briefly as follows:

(a) The film-forming metal of the base-electrode must be of very high purity. In the case of aluminum, the purity must be at least 99.85% and preferably should be higher.

(b) The dielectric must consist of a dense, thin, non-porous film of the oxide of the filming metal. In the case of aluminum it must consist of the bi-refringent crystalline modification of aluminum oxide, and the process of forming the film must be one producing such modification.

(c) The oxide film must be electrolytically formed to a voltage at least 100 volts higher than is the maximum voltage to which the dielectric is subjected in the operation of the condenser.

(d) The contact surface between the dielectric and the second electrode must at all times remain absolutely dry. Thus when applying the second electrode, which is preferably a metal coating, the contact surface must be free from all traces of moisture during such application and must remain so during the life of the condenser.

By meeting these four requirements, electrostatic condensers of the above type may be produced having breakdown voltages in excess of 550 volts and power factors which even at radio frequencies favorably compare with the power factors of other types of electrostatic condensers. Such condensers exhibit a high degree of electrical stability even after extended periods of operation, and remain electrically unaffected under the most severe operating conditions of temperature, humidity, mechanical vibration and the like. Furthermore, such condensers exhibit unusually high specific capacity values. For example, at 550 volts, capacity values of 26,000 $\mu\mu$ per cm.$^2$ are readily obtained.

The invention will be more particularly described with reference to the appended drawing forming part of the specification, and in which:

Figure 1 is a cross-sectional view of a condenser made in accordance with the invention;

Fig. 2 is a top view of the condenser of Figure 1;

Fig. 3 is a graph showing the critical relationship existing between the breakdown voltage of the dry film and the purity of the aluminum from which it is formed; and Fig. 4 is a sectional view showing another embodiment of the invention.

Referring to Figs. 1 and 2, the condenser shown comprises a plate 10 serving as one electrode of the condenser, which to meet the first abovementioned requirement consists of aluminum of high purity, for example of a purity of 99.9%.

I have found that a critical relationship exists between the purity of the aluminum used for the plate 10 and the breakdown voltage of the condenser dielectric in its dry state (and hence the maximum realizable operating voltage of the condenser). This relationship is shown in Fig. 3 wherein the breakdown voltage of dry films electrolytically formed in identical manner and to the same filming voltage (900 volts) is plotted as a function of the purity of the aluminum filming base. It will be noted that in the region of 99.85% purity there occurs a critical change in the electrical behavior of the dry films, and that the breakdown voltage of films formed on aluminum greater than 99.85% pure is significantly higher than the breakdown voltage of films formed on aluminum less than 99.85% pure.

Disposed on plate 10 there is a dielectric film 11 in which in accordance with the second requirement must consist of a thin, dense, non-porous and continuous film of the bi-refringent crystalline modification of aluminum oxide, such modification being identified with the form of aluminum oxide which in thin layers exhibits a breakdown strength of approximately $4.5 \times 10^6$ volts per centimeter thickness. To obtain such a film the aluminum is electrolytically formed in an aqueous solution comprising ionogens of the type of boric acid, tartaric acid and citric acid. The concentration of the ionogen is determined by the particular ionogen used and the voltage to which the film is to be formed. For example, when using an aqueous boric acid solution to form the aluminum to 550 volts, I have found a solution of 120 grams of boric acid per liter of water as satisfactory. For higher filming voltages I use more dilute concentrations, for example to form to 1000 volts I use 20 grams of boric acid per liter of water.

Since tartaric acid and citric acid dissociate in solution more readily than boric acid, correspondingly lower concentrations are required when using these ionogens. For instance, to form to 550 volts I may use 1 gram of citric acid per liter of water.

To meet the third requirement, I use in the electrolytic formation a voltage at least 100 volts greater than is to be the maximum operating voltage of the condenser. I have found that unless this requirement is met, the film is electrically unstable under the influence of an electrical field, whereby in operation the condenser undergoes intermittent and unpredictable changes both in conductance and power factor which renders the condenser useless for all practical purposes. While by meeting the above requirement a high degree of stability is obtained, I have found that optimum characteristics are obtained when the film is formed to a voltage of at least (1.7 to 2.0) V+100 volts where V is the maximum operating voltage of the condenser.

To facilitate the formation of the bi-refringent crystalline modification of aluminum oxide, the temperature of the electrolyte should be maintained between 90° C. and 100° C. during the formation.

After the film has been formed, the filmed electrode is thoroughly washed in distilled water to remove all traces of the electrolyte.

As the second electrode of the condenser I apply to the dielectric a thin metallic layer 12, which in accordance with the fourth requirement is moisture-impervious and which I apply in such manner that the contact surface between the dielectric and the electrode is free of all traces of moisture initially and remains in such condition. More particularly I form the electrode 12 by evaporating under vacuum lead, zinc, aluminum, bismuth or tin to form a non-porous metallic coating on the dielectric film.

For this purpose the filmed electrode 10—11 is placed in a vacuum flask containing an amount of the metal from which the electrode 12 is to be formed. By heating this metal to incandescence, a thin moisture-impervious integral coating is formed on the surface of the dielectric layer. The degree of vacuum required to form the metal coating is determined by the particular metal to be evaporated. For example, for lead, zinc, bismuth or tin, a vacuum equivalent to one millimeter of mercury has been found sufficient, whereas for aluminum a vacuum of at least $10^{-4}$ millimeter must be used. Various methods of heating may be used to evaporate the metal. For example, the metal may be heated by an electrical induction field, by means of an incandescent filament which surrounds the metal, or the metal itself may be used as a filament across which a suitable voltage is applied.

By forming the electrode 12 in the manner above described all traces of moisture are removed from the surface of the dielectric, and the electrode coating is applied while the dielectric surface is in its moisture-free state. Moreover, since the electrode itself is moisture-impervious, continuous and integrally adhering to the dielectric layer, the contact surface between the dielectric and the electrode is maintained moisture-free throughout the life of the condenser.

I have found that the dielectric film when formed in the manner above set forth is continuous and uniform over substantially the entire surface of the plate 10; however at the edges thereof minor imperfections may exist at which portions short-circuiting of the condenser may occur. To remedy this I mask the edges of the filmed electrode 10—11 prior to the deposition of the electrode 12. Such masking, as shown in Figs. 1 and 2 at 16, can be achieved by a coating of varnish, wax or the like.

For the external electrical connection for the electrode 10 I provide it with an unfilmed integral tab portion 13, and for the electrical connection of electrode 12 I provide, for example, a flexible wire 14 soldered to the electrode as shown at 15.

While the invention has been illustrated above in connection with a single-unit condenser, it should be well understood that the condenser element described and its method of manufacture is equally applicable for the manufacture of multiple-unit condensers.

Fig. 4 illustrates the invention as applied to a condenser of the wound cylindrical type. The condenser there shown in cross-sectional view comprises an aluminum foil 40 serving as one electrode of the condenser, dielectric layers 41 and 42 electrolytically formed on opposite sides of the electrode 40, and a second electrode 43. The electrode 40, dielectric layers 41—42 and electrode 43 conform to the requirements above set forth in connection with the condenser of Figs. 1 and 2.

In practice the dielectric filming of the foil 40 and the deposition of the electrode 43 takes place prior to the winding thereof into the cylindrical form shown. However, such winding of the filmed foil may cause the convex, or outer dielectric layer to crack under the tension so induced. For this reason and to preclude short-circuits through such cracks I prefer to restrict the effective area of the condenser to the concave, or inner, surface of the dielectric such as is shown in Fig. 4 wherein the electrode 43 is applied on the dielectric layer 41 only. To maintain the highly desirable inherent electrical properties of the condenser, the dielectric layer 42 is coated with a suitable moisture-resistant insulating material such as polystyrene, wax, varnish or the like, such coating being shown at 44.

While I have described my invention by means of a specific example, and in a specific embodiment, I do not wish to be limited thereto for obvious modifications will appear to those skilled in the art without departing from the spirit and scope of the invention.

What I claim is:

1. An electrical condenser comprising a helically wound aluminum foil having a purity greater than about 99.85%, dense, thin, non-porous films of the bi-refringent crystalline modification of aluminum oxide electrolytically formed on opposite sides of the foil, a second electrode consisting of a moisture-impervious integral metallic coating on the inner dielectric film and a moisture-impervious insulating coating on the outer dielectric film.

2. In the manufacture of electrical condensers, the process comprising the steps, immersing an aluminum electrode having a purity greater than about 99.85% in an electrolyte selected from the class consisting of aqueous solutions of boric acid, tartaric acid and citric acid, electrolytically forming thereon at a temperature between 90° C.

and 100° C. a dense, thin, non-porous film of the bi-refringent crystalline modification of aluminum oxide to a thickness corresponding to a filming voltage at least 100 volts greater than the maximum operating voltage of the condenser, drying the film so formed, and thereafter evaporating under vacuum a thin, moisture-impervious coating of one of the metals of the group consisting of lead, zinc, bismuth, tin and aluminum on the surafce of the aluminum oxide film.

3. In the manufacture of electrical condensers, the process comprising the steps, immersing an aluminum electrode having a purity greater than 99.85% in an electrolyte selected from the class consisting of aqueous solutions of boric acid, tartaric acid and citric acid, electrolytically forming thereon at a temperature between 90° C. and 100° C. a dense, thin, non-porous film of the bi-refringent crystalline modification of aluminum oxide to a thickness corresponding to a filming voltage of at least $1.70\,V+100$ volts, where V is the desired maximum operating voltage of the condenser, drying said film under vacuum and evaporating on the film a moisture-impervious coating of aluminum by treatment under a vacuum of at least $10^{-4}$ millimeter pressure.

4. An electrical condenser comprising a helically wound aluminum foil having a purity greater than about 99.85%, dense, thin, non-porous films of the bi-refringent crystalline modification of aluminum oxide electrolytically formed on opposite sides of the foil, a second electrode consisting of a moisture-impervious integral aluminum coating on the inner dielectric film and a moisture-impervious insulating coating on the outer dielectric film.

JOHN BURNHAM.